(12) United States Patent
Mou et al.

(10) Patent No.: US 11,204,027 B2
(45) Date of Patent: *Dec. 21, 2021

(54) FLUID SYSTEM

(71) Applicant: Microjet Technology Co., Ltd., Hsinchu (TW)

(72) Inventors: Hao-Jan Mou, Hsinchu (TW); Shih-Chang Chen, Hsinchu (TW); Li-Pang Mo, Hsinchu (TW); Jia-Yu Liao, Hsinchu (TW); Che-Wei Huang, Hsinchu (TW); Chi-Feng Huang, Hsinchu (TW)

(73) Assignee: MICROJET TECHNOLOGY CO., LTD., Hsinchu (TW)

(*) Notice: Subject to any disclaimer, the term of this patent is extended or adjusted under 35 U.S.C. 154(b) by 61 days.

This patent is subject to a terminal disclaimer.

(21) Appl. No.: 16/109,267

(22) Filed: Aug. 22, 2018

(65) Prior Publication Data
US 2019/0101938 A1    Apr. 4, 2019

(30) Foreign Application Priority Data

Sep. 29, 2017 (TW) ................................ 106133645

(51) Int. Cl.
*G05D 7/06* (2006.01)
*F04B 43/04* (2006.01)
(Continued)

(52) U.S. Cl.
CPC .......... *F04B 43/046* (2013.01); *F04B 45/047* (2013.01); *G05D 7/0694* (2013.01);
(Continued)

(58) Field of Classification Search
CPC .... F04B 43/046; F04B 45/047; F04B 19/006; F04B 39/08; F04B 39/10; F04B 39/123;
(Continued)

(56) References Cited

U.S. PATENT DOCUMENTS 5,757,400 A * 5/1998 Hoisington ................ B41J 2/15
347/40
5,798,600 A * 8/1998 Sager .................... F04B 17/003
310/328
(Continued)

FOREIGN PATENT DOCUMENTS

CN          2580141 Y     10/2003
CN        101449089 A      6/2009
(Continued)

OTHER PUBLICATIONS

Extended European Search Report, dated Oct. 19, 2018, for European Application No. 18190134.9.

*Primary Examiner* — Dominick L Plakkoottam
(74) *Attorney, Agent, or Firm* — Birch, Stewart, Kolasch & Birch, LLP

(57) ABSTRACT

A fluid system includes a fluid active region, a fluid channel, a convergence chamber and plural valves. The fluid active region includes at least one fluid-guiding unit. The fluid-guiding unit is enabled under control to transport fluid to be discharged out through the outlet aperture. The fluid channel is in communication with the outlet aperture of the fluid active region, and has plural branch channels to split the fluid discharged from the fluid active region. The convergence chamber is in communication with the fluid channel. The valves each of which is disposed in the corresponding branch channel, wherein the fluid is discharged out through the branch channels according to opened/closed states of the valves under control. The fluid system of the present disclosure is capable of acquiring required flow rate, pressure and amount of the fluid to be transported.

15 Claims, 13 Drawing Sheets

(51) Int. Cl.
*F04B 45/047* (2006.01)
*F16K 99/00* (2006.01)
(52) U.S. Cl.
CPC ............. *F16K 2099/0084* (2013.01); *F16K 2099/0092* (2013.01); *F16K 2099/0094* (2013.01)
(58) Field of Classification Search
CPC ...... F04B 43/043; F04B 49/007; F04B 49/22; G05D 7/0694; F16K 2099/0084
See application file for complete search history.

(56) References Cited

U.S. PATENT DOCUMENTS

| | | | |
|---|---|---|---|
| 7,976,795 | B2 | 7/2011 | Zhou et al. |
| 8,267,885 | B2 * | 9/2012 | Landherr ............... A61M 1/28 604/151 |
| 9,260,973 | B2 * | 2/2016 | Petersen ................ F01D 7/00 |
| 10,188,581 | B2 * | 1/2019 | Smith ................. A61M 1/0003 |
| 2005/0263207 | A1 * | 12/2005 | Karasawa ............... F04B 23/04 141/67 |
| 2006/0006108 | A1 * | 1/2006 | Arias ................. H01M 8/04447 210/232 |
| 2007/0034523 | A1 * | 2/2007 | Yerazunis ............... F04B 17/00 205/633 |
| 2009/0268548 | A1 * | 10/2009 | Hartmann ............. B01F 5/0646 366/173.1 |
| 2011/0127459 | A1 * | 6/2011 | Takahashi ........... F16K 99/0048 251/333 |
| 2013/0186078 | A1 * | 7/2013 | Lemke ................ F16K 99/0015 60/325 |
| 2014/0286795 | A1 * | 9/2014 | Kamitani ................ F04B 39/10 417/62 |
| 2015/0060012 | A1 * | 3/2015 | Kamitani ................ F28F 27/02 165/59 |
| 2017/0122298 | A1 * | 5/2017 | Asai .................... F16K 99/0005 |
| 2019/0099774 | A1 * | 4/2019 | Mou .................... F04B 43/046 |
| 2019/0101111 | A1 * | 4/2019 | Mou .................... F16K 99/0048 |
| 2019/0101220 | A1 * | 4/2019 | Mou .................... F04B 7/0076 |
| 2019/0101940 | A1 * | 4/2019 | Mou .................... G05D 7/0694 |
| 2019/0226471 | A1 * | 7/2019 | Mou .................... F16K 99/0015 |

FOREIGN PATENT DOCUMENTS

| | | |
|---|---|---|
| CN | 101560972 A | 10/2009 |
| CN | 201475347 U | 5/2010 |
| CN | 103016319 A | 4/2013 |
| CN | 203842597 U | 9/2014 |
| CN | 104302913 A | 1/2015 |
| EP | 3222351 A1 | 9/2017 |
| WO | WO 2010/097740 A1 | 9/2010 |

\* cited by examiner

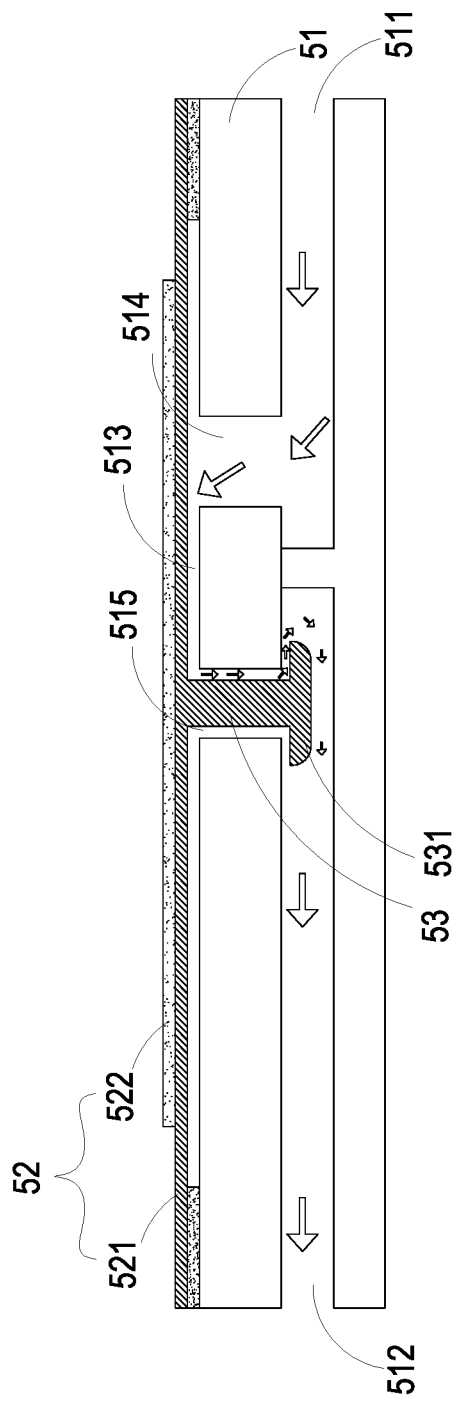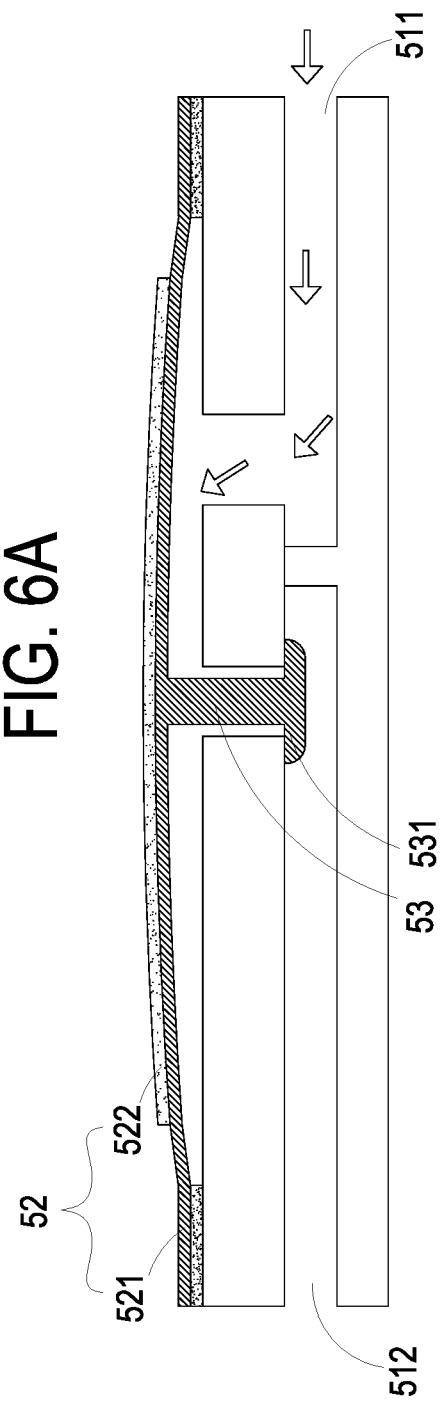

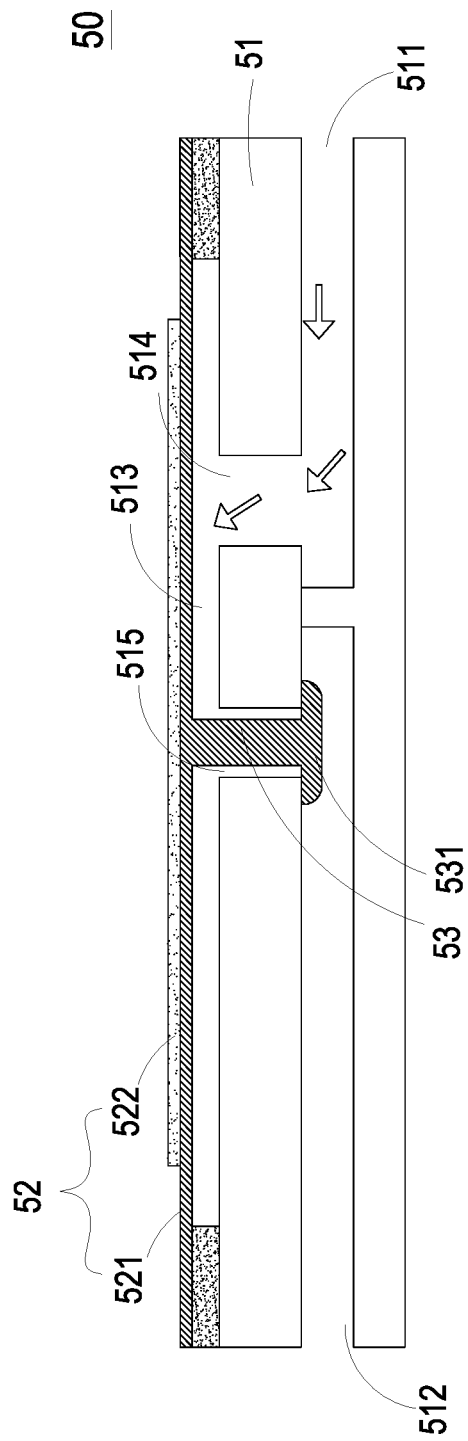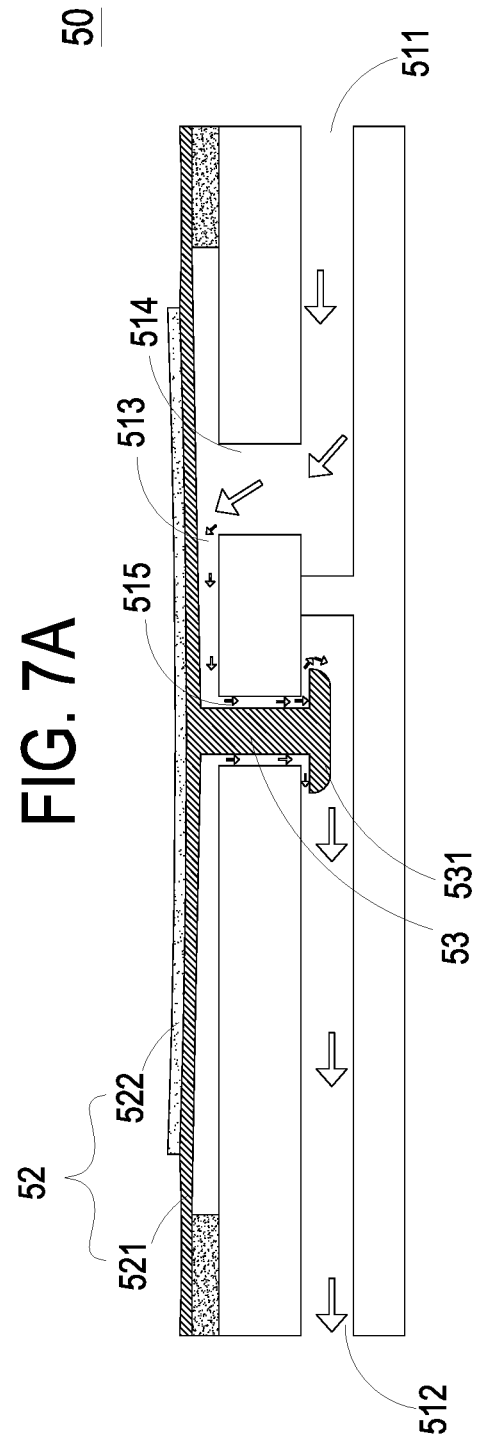

FLUID SYSTEM

FIELD OF THE INVENTION

The present disclosure relates to a fluid system, and more particularly to a miniature integrated fluid system.

BACKGROUND OF THE INVENTION

Nowadays, in various fields such as pharmaceutical industries, computer techniques, printing industries or energy industries, the products are developed toward elaboration and miniaturization. The fluid transportation devices are important components that are used in, for example micro pumps, atomizers, print heads or industrial printers. Therefore, how to utilize an innovative structure to break through the bottleneck of the prior art has become an important part of development.

With the rapid development of science and technology, the applications of fluid transportation devices are becoming more and more diversified. For example, fluid transportation devices are gradually popular in industrial applications, biomedical applications, medical care applications, electronic cooling applications and so on, or even the most popular wearable devices. It is obvious that the fluid transportation devices gradually tend to miniaturize the structure and maximize the flow rate thereof.

Although the miniature fluid transportation device is capable of transporting gas continuously, there are still some drawbacks. For example, since the chamber or fluid channel of the miniature fluid transportation device has limited capacity, it is difficult to transport a great amount of gas. For solving the above drawbacks, it is important to provide a gas transportation device with a valve to control the continuation or interruption of the gas transportation, control the gas to flow in one direction, accumulate the gas in the limited-capacity chamber or fluid channel and increase the amount of the gas to be discharged.

SUMMARY OF THE INVENTION

An object of the present invention is to provide an integrated fluid system to address the issues that the prior arts can't meet the requirements of the miniature fluid system. The fluid system includes a fluid active region, a fluid channel, a convergence chamber and plural valves. The plural valves may be active valves or passive valves. The fluid active region includes one or plural fluid-guiding units. Each of the fluid-guiding units has an outlet aperture. The fluid channel is in communication with all the outlet apertures of the flow-guiding units in the fluid active region. The fluid channel includes plural branch channels to split the fluid discharged from the fluid active region. The convergence chamber is in communication with the fluid channel for allowing the fluid discharged from the fluid channel to be accumulated therein. The plural valves each of which is disposed in the corresponding branch channel. The fluid is discharged out through the branch channels according to opened/closed states of the valves.

In an embodiment, each of the plural valves is an active valve. The fluid system further includes a controller electrically connected to the plural valves to control the opened/closed states of the plural valves. The controller and the at least one fluid-guiding unit are made by a system-in-package manner to form an integrated structure. The fluid active region includes plural fluid-guiding units. The plural fluid-guiding units are connected with each other and disposed in a serial arrangement, in a parallel arrangement or in a serial-and-parallel arrangement to transport the fluid. The lengths and widths of the plural branch channels are preset according to the specific required amount of the fluid to be transported or the fluid flow rate. The plural branch channels are connected with each other and disposed in a serial arrangement, in a parallel arrangement or in a serial-and-parallel arrangement.

From the above descriptions, the fluid system of the present disclosure has miniature volume and is capable of acquiring specific fluid flow rate, fluid pressure and amount of the fluid to be transported.

The above contents of the present disclosure will become more readily apparent to those ordinarily skilled in the art after reviewing the following detailed description and accompanying drawings, in which:

BRIEF DESCRIPTION OF THE DRAWINGS

FIGS. 6A and 6B are schematic cross-sectional views illustrating the actions of an exemplary valve used in the fluid system of the present disclosure; and FIGS. 7A and 7B are schematic cross-sectional views illustrating the actions of another exemplary valve used in the fluid system of the present disclosure.

DETAILED DESCRIPTION OF THE PREFERRED EMBODIMENT

Figure 1:
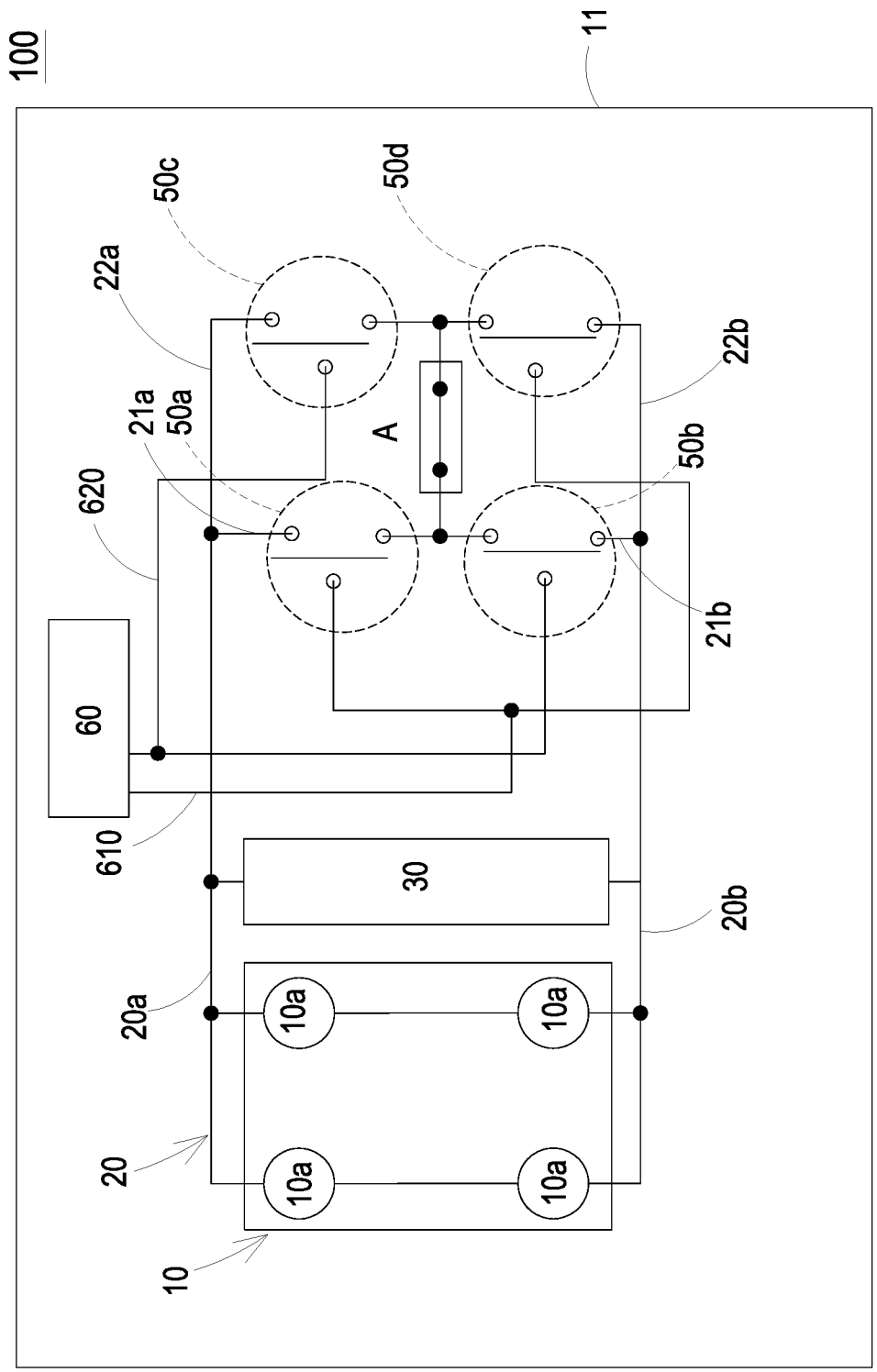
FIG. 1 schematically illustrates a fluid system according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Please refer to FIGS. 1, 2A, 2B, 2C and 2D. The present discourse provides a fluid system 100 including at least one fluid active region 10, at least one fluid-guiding unit 10a, at least one outlet aperture 160, at least one fluid channel 20, a plurality of branch channels 20a, 20b, 21a, 21b, 22a, 22b and at least one convergence chamber 30. The number of the fluid active region 10, the fluid channel 20 and the convergence chamber 30 is exemplified by one for each in the following embodiments but not limited thereto. It is noted that each of the fluid active region 10, the fluid channel 20 and the convergence chamber 30 can also be provided in plural numbers.

FIG. 1 schematically illustrates a fluid system according to an embodiment of the present disclosure. As shown in FIG. 1, the fluid system 100 includes a fluid active region 10, a fluid channel 20, a convergence chamber 30, plural valves 50a, 50b, 50c and 50d, and a controller 60. In an embodiment, the above components are made by a system-in-package manner to form on a substrate 11, so that a miniature integrated structure is formed. The fluid active region 10 includes one or plural fluid-guiding units 10a. The plural fluid-guiding units 10a are connected with each other and disposed in a serial arrangement, in a parallel arrangement or in a serial-and-parallel arrangement. When each fluid-guiding unit 10a is enabled, a pressure difference within the fluid-guiding unit 10a is formed, by which fluid (e.g., gas) is inhaled into the fluid-guiding unit 10a and pressurized to be discharged out through an outlet aperture 160 of the fluid-guiding unit 10a (see FIG. 2A). Consequently, the fluid is transported through the fluid-guiding unit 10a.

In this embodiment, the fluid active region 10 includes four fluid-guiding units 10a. The four fluid-guiding units 10a are connected with each other and disposed in a serial-and-parallel arrangement. The fluid channel 20 is in communication with all the outlet apertures 160 (see FIG. 2A) of the fluid-guiding units 10a to receive the fluid discharged from the fluid-guiding units 10a. The structures, actions and dispositions of the fluid-guiding unit 10a and the fluid channel 20 will be described as follows. The fluid channel 20 includes plural branch channels 20a and 20b to split the fluid discharged from the fluid active region 10. Consequently, a required amount of the fluid to be transported is determined. The branch channels 20a and 20b are exemplified in the above embodiment, but the number of the branch channels is not restricted. The convergence chamber 30 is in communication with the branch channels 20a and 20b, and thus the convergence chamber 30 is in communication with the fluid channel 20. Consequently, the fluid is transported to the convergence chamber 30 to be accumulated and stored in the convergence chamber 30. When the fluid system 100 is under control to discharge the required amount of the fluid, the convergence chamber 30 can supply the fluid to the fluid channel 20 so as to increase the amount of the fluid to be transported.

As mentioned above, the branch channels 20a and 20b are connected with the fluid channel 20 and disposed in a parallel arrangement as shown in FIG. 1, but not limited thereto. In some other embodiments, the branch channels 20a and 20b are connected with each other and disposed in a serial arrangement or in a serial-and-parallel arrangement. The lengths and widths of the plural branch channels 20a and 20b are preset according to the specific required amount of the fluid to be transported. In other words, the flow rate and amount of the fluid to be transported are influenced by the lengths and widths of the branch channels 20a and 20b. That is, the required lengths and widths of the branch channels 20a and 20b may be calculated in advance according to the specific required amount of the fluid to be transported.

In this embodiment, as shown in FIG. 1, the branch channel 20a further includes two sub-branch channels 21a and 22a (also referred as branch channels), and the branch channel 20b further includes two sub-branch channels 21b and 22b (also referred as branch channels). The sub-branch channels 21a and 22a are respectively connected with the branch channel 20a in a serial arrangement, but not limited thereto. The sub-branch channels 21a and 22a are connected with each other and disposed in a parallel arrangement or in a serial-and-parallel arrangement. Similarly, the sub-branch channels 21b and 22b are respectively connected with the branch channel 20b in a serial arrangement, but not limited thereto. The sub-branch channels 21b and 22b are connected with each other and disposed in a parallel arrangement or in a serial-and-parallel arrangement. The valves 50a, 50c, 50b and 50d may be active valves or passive valves. In this embodiment, the valves 50a, 50c, 50b and 50d are active valves, and the valves 50a, 50c, 50b and 50d are disposed in the sub-branch channels 21a, 22a, 21b and 22b, respectively. The valves 50a, 50c, 50b and 50d can control the fluid communication state of the sub-branch channels 21a, 22a, 21b and 22b in an open state or a close state. When the valve 50a is in the open state, the sub-branch channel 21a is opened to discharge the fluid to an output region A. When the valve 50b is in the open state, the sub-branch channel 21b is opened to discharge the fluid to the output region A. When the valve 50c is in the open state, the sub-branch channel 22a is opened to discharge the fluid to the output region A. When the valve 50d is in the open state, the sub-branch channel 22b is opened to discharge the fluid to the output region A. The controller 60 includes two conductive wires 610 and 620. The conductive wire 610 is electrically connected with the control terminals of the valves 50a and 50d, and the conductive wire 620 is electrically connected with the control terminals of the valves 50b and 50c. Consequently, the opened/closed states of the valves 50a, 50c, 50b and 50d can be controlled by the controller 60, so that the fluid communication states of the sub-branch channels 21a, 22a, 21b and 22b corresponding to the valves 50a, 50c, 50b and 50d are controlled by the controller 60 for allowing the fluid to be selectively transported to the output region A. Preferably, the controller 60 and the at least one fluid-guiding unit 10a are made by a system-in-package manner to form an integrated structure.

Figure 2A:
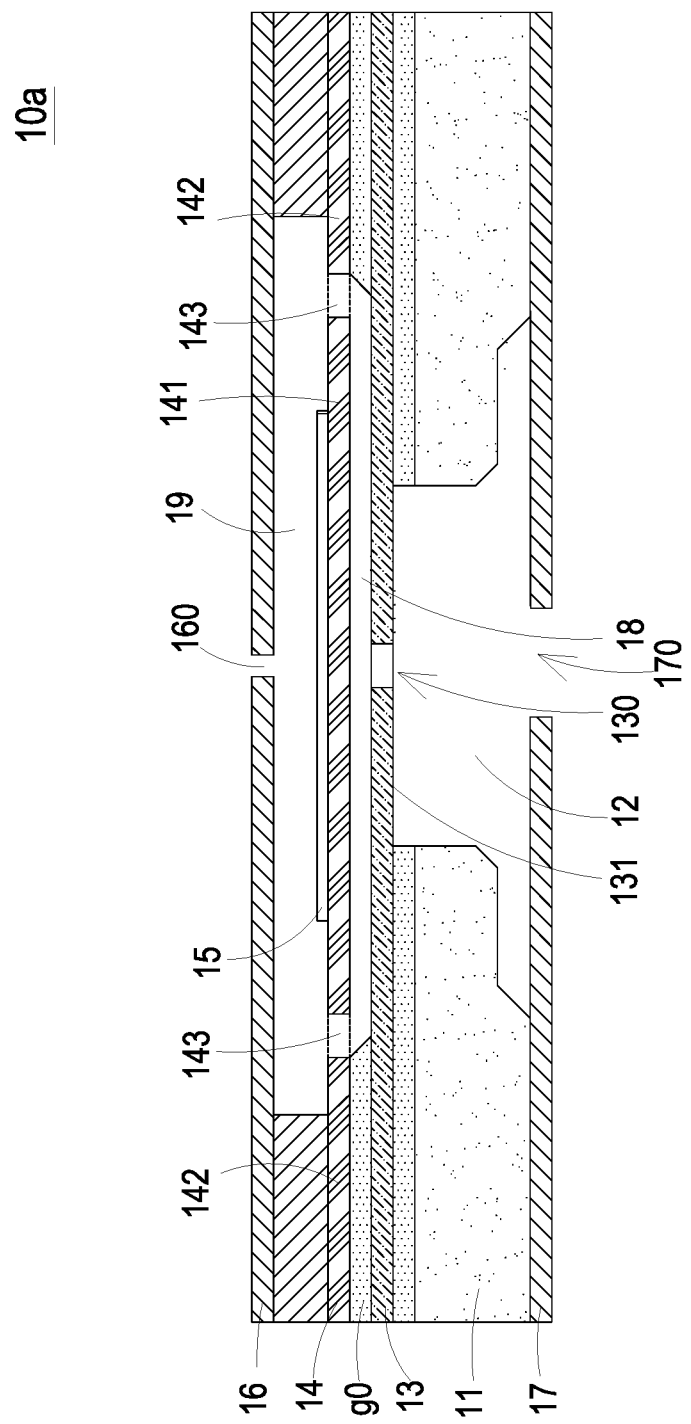
FIG. 2A is a schematic cross-sectional view illustrating a fluid-guiding unit of the fluid system according to the embodiment of the present disclosure.

FIG. 2A is a schematic cross-sectional view illustrating a fluid-guiding unit of the fluid system according to the embodiment of the present disclosure. In an embodiment, the fluid-guiding unit 10a can be a piezoelectric pump. As shown in FIG. 2A, each fluid-guiding unit 10a includes an inlet plate 17, the substrate 11, a resonance plate 13, an actuating plate 14, a piezoelectric element 15 and an outlet plate 16, which are stacked on each other sequentially. The inlet plate 17 has at least one inlet aperture 170. The resonance plate 13 has a central aperture 130 and a movable part 131. The movable part 131 is a flexible structure of the resonance plate 13 that is not fixed and disposed on the substrate 11. The central aperture 130 is formed in a middle region adjacent to the movable part 131. A first chamber 12 is formed in the substrate 11 and formed between the resonance plate 13 and the inlet plate 17. The actuating plate 14 is a hollow and suspension structure. The actuating plate 14 includes a suspension part 141, an outer frame part 142 and plural vacant spaces 143. The suspension part 141 of the actuating plate 14 is connected with the outer frame part 142 through plural connecting parts (not shown), so that the suspension part 141 is suspended in the outer frame part 142. The plural vacant spaces 143 are defined between the suspension part 141 and the outer frame part 142 and are disposed for allowing the fluid to flow therethrough. The disposition, the types and the numbers of the suspension part 141, the outer frame part 142 and the vacant spaces 143 may be varied according to the practical requirements, but not limited thereto. Preferably but not exclusively, the actuating plate 14 may be made of a metallic film or a polysilicon film. Moreover, a gap g0 formed between the actuating plate 14 and the resonance plate 13 is defined as a second chamber 18. The outlet plate 16 has an outlet aperture 160. A third chamber 19 is formed between the actuating plate 14 and the outlet plate 16.

In some embodiments, the substrate 11 of the fluid-guiding unit 10a further includes a driving circuit (not shown) electrically connected to the positive electrode and the negative electrode of the piezoelectric element 15 so as to provide a driving power to the piezoelectric element 15, but not limited thereto. In other embodiments, the driving circuit may be disposed at any position within the fluid-guiding unit 10a. The disposed position of the driving circuit may be varied according to practical requirements.

Figure 2B:
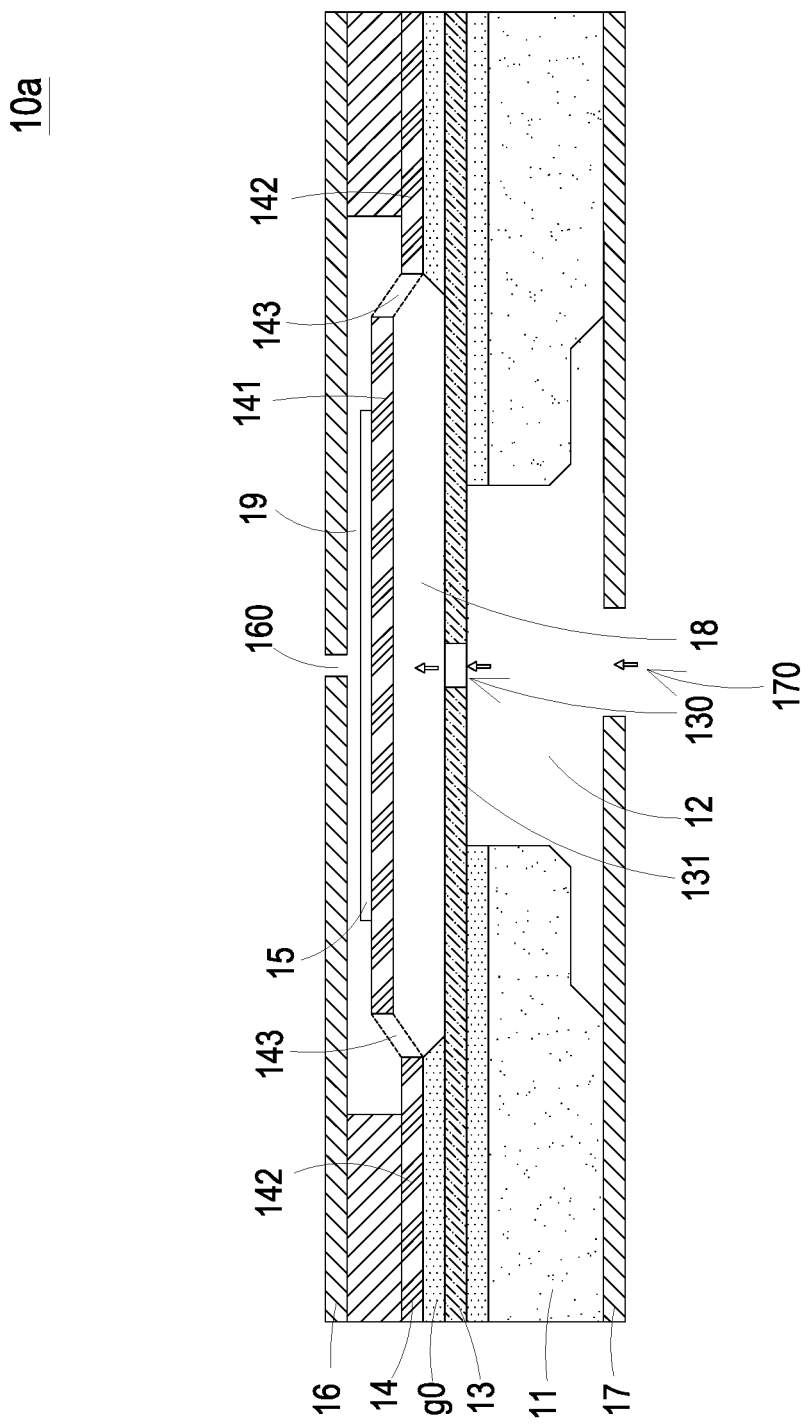
FIGS. 2B, 2C and 2D schematically illustrate the actions of the fluid-guiding unit of the fluid system of FIG. 2A.
Figure 2C:
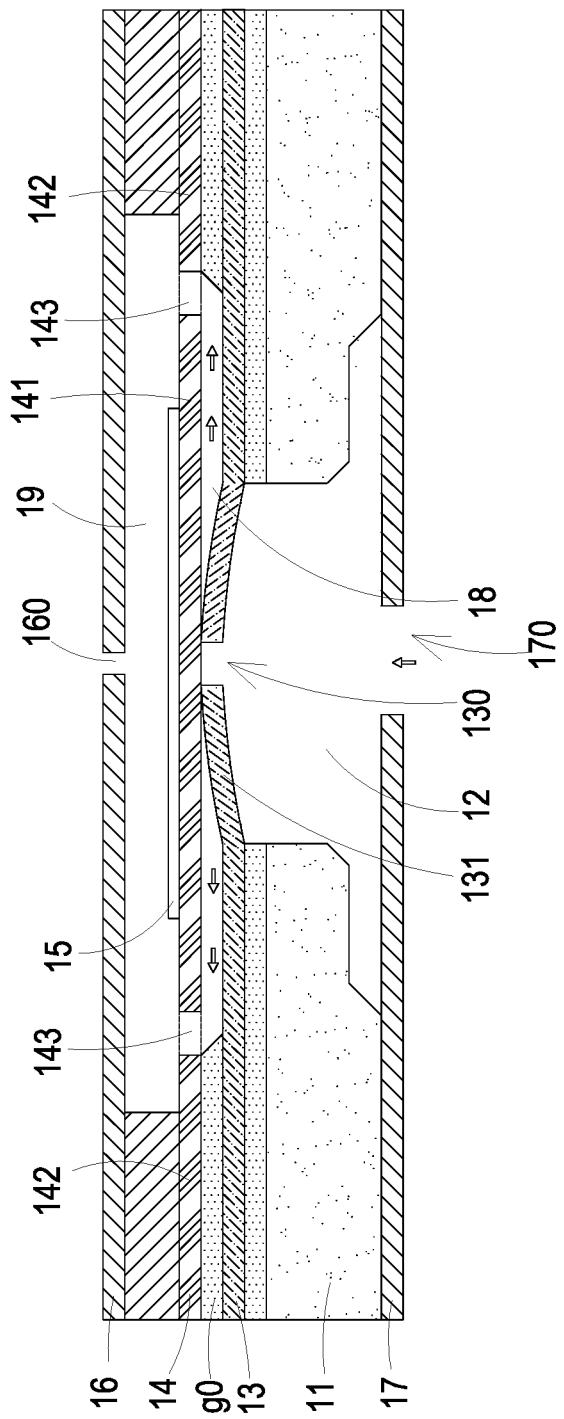
Figure 2D:
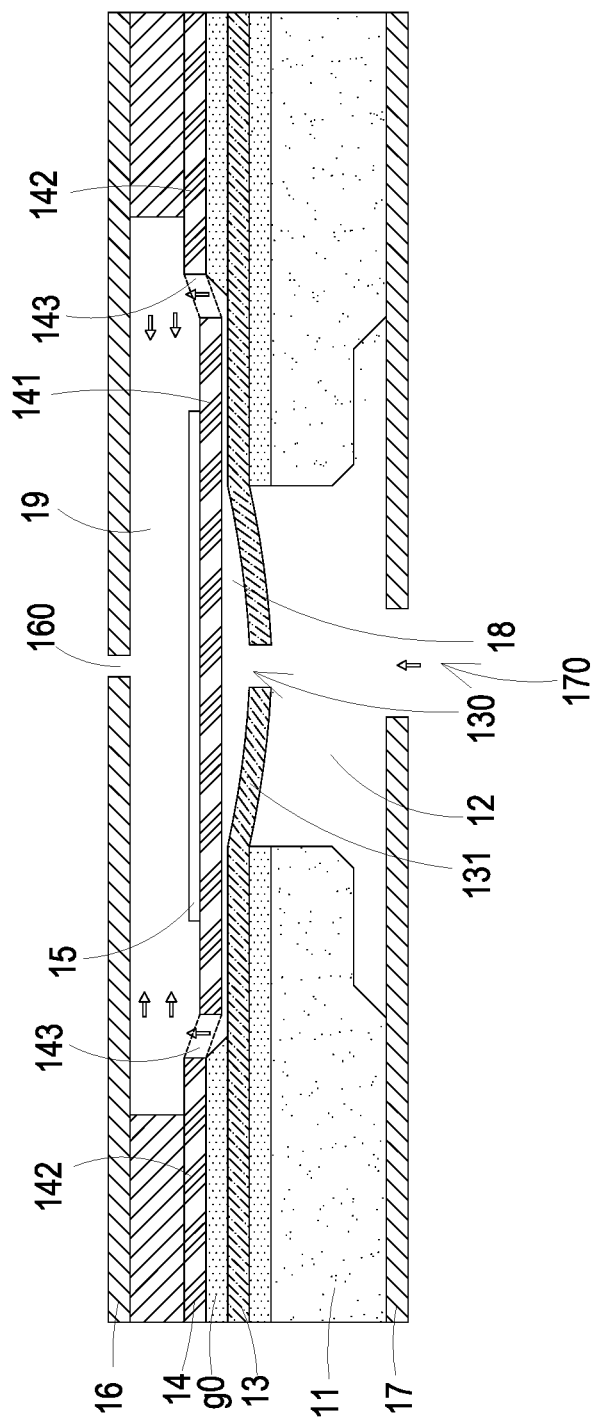

FIGS. 2B, 2C and 2D schematically illustrate the actions of the fluid-guiding unit of the fluid system as in FIG. 2A. As shown in FIG. 2A, the fluid-guiding unit 10a is in a disable state (i.e. in an initial state). When the piezoelectric element 15 is driven in response to an applied voltage, the piezoelectric element 15 undergoes a bending deformation to drive the actuating plate 14 to vibrate along a vertical direction in a reciprocating manner. Please refer to FIG. 2B. As the suspension part 141 of the actuating plate 14 vibrates upwardly (i.e. away from the inlet plate 17), the volume of the second chamber 18 is enlarged and the pressure in the second chamber 18 is reduced. The ambient fluid is inhaled into the fluid-guiding unit 10a through the inlet aperture 170 of the inlet plate 17 in accordance with the external pressure, and is then converged into the first chamber 12. Then, the fluid is transported upwardly to flow into the second chamber 18 through the central aperture 130 of the resonance plate 13, which is spatially corresponding to the first chamber 12.

Please refer to FIG. 2C. In response to the vibration of the suspension part 141 of the actuating plate 14, the resonance of the resonance plate 13 occurs. Consequently, the movable part 131 vibrates upwardly (i.e. away from the inlet plate 17) and the suspension part 141 of the actuating plate 14 also vibrates downwardly (i.e. toward the inlet plate 17) at the same time. In such a manner, the movable part 131 of the resonance plate 13 is attached to and abuts against the suspension part 141 of the actuating plate 14. A communication space between the central aperture 130 of the resonance plate 13 and the second chamber 18 is closed. Consequently, the second chamber 18 is compressed to reduce the volume thereof and increase the pressure therein, and the volume of the third chamber 19 is enlarged and the pressure in the third chamber 19 is reduced. Under this circumstance, a pressure gradient occurs to push the fluid in the second chamber 18 to move toward a peripheral portion of the second chamber 18, and to flow into the third chamber 19 through the vacant spaces 143 of the actuating plate 14. Please refer to FIG. 2D. The suspension part 141 of the actuating plate 14 vibrates downwardly (i.e. toward the inlet plate 17) and drives the movable part 131 of the resonance plate 13 to vibrate downwardly (i.e. toward the inlet plate 17), so as to further compress the first chamber 18. As a result, most of the fluid is transported into the third chamber 19 and is temporarily stored in the third chamber 19.

Finally, the suspension part 141 of the actuating plate 14 vibrates upwardly (i.e. away from the inlet plate 17) to compress the volume of the third chamber 19 and to reduce the volume of the third chamber 19 and increase the pressure in the third chamber 19. Thus, the fluid stored in the third chamber 19 is discharged out to an exterior of the outlet plate 16 through the outlet aperture 160 of the outlet plate 16 so as to accomplish a fluid transportation process. The above actions and steps of FIGS. 2B, 2C and 2D indicate a complete cycle of the reciprocating vibration of the actuating plate 14. When the piezoelectric element 15 is enabled, the suspension part 141 of the actuating plate 14 and the movable part 131 of the resonance plate 13 perform the above actions repeatedly. Consequently, the fluid is continuously inhaled into the inlet aperture 170 and pressurized to be discharged out through the outlet aperture 160. In such way, the purpose of fluid transportation is achieved. In some embodiments, the vibration frequency of the resonance plate 13 along the vertical direction in the reciprocating manner may be identical to the vibration frequency of the actuating plate 14. That is, the resonance plate 13 and the actuating plate 14 synchronously vibrate along the upward direction or the downward direction. It is noted that numerous modifications and alterations of the actions of the fluid-guiding unit 10a may be made while retaining the teachings of the disclosure.

Consequently, the pressure gradient is formed in the fluid channels of the fluid-guiding unit 10a to facilitate the fluid to flow at a high speed. Moreover, since there is an impedance difference between the inlet direction and the outlet direction, the fluid can be transported from an inhale end to a discharge end of the fluid-guiding unit 10a. Moreover, even if a gas pressure exists at the discharge end, the fluid-guiding unit 10a still has the capability to discharge out the fluid while achieving the silent efficacy.

Figure 3A:
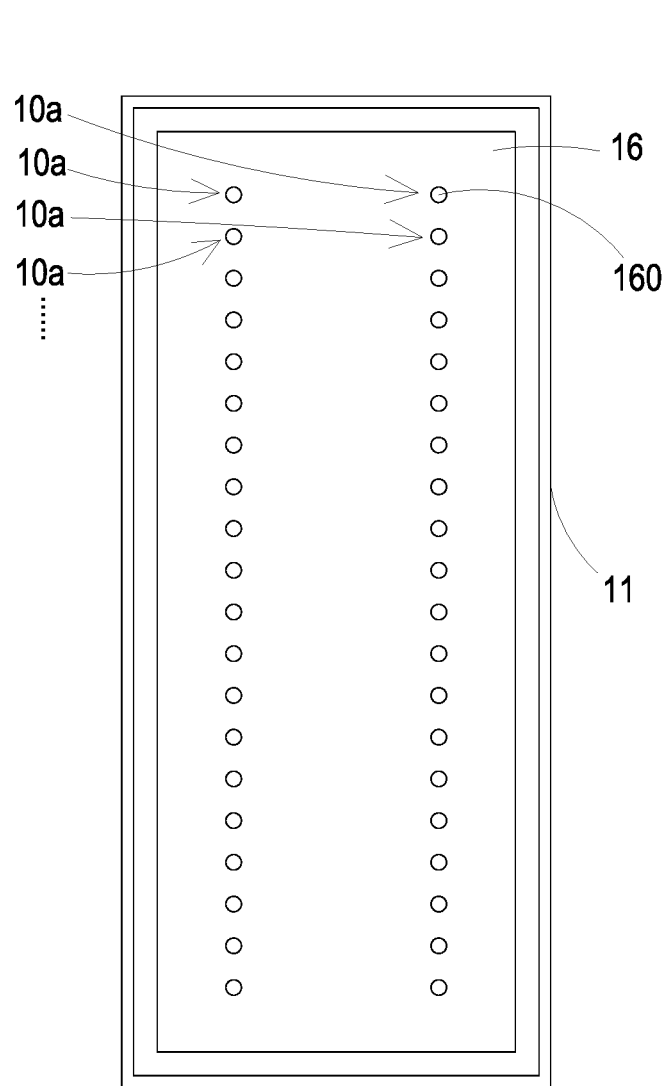
FIG. 3A schematically illustrates the fluid active region of the fluid system as shown in FIG. 1.

FIG. 3A schematically illustrates the fluid active region of the fluid system as shown in FIG. 1. The fluid active region 10 includes plural fluid-guiding units 10a. The amount of the fluid to be discharged from the fluid active region 10 is adjusted according to the specific arrangement of the fluid-guiding units 10a. In this embodiment, the plural fluid-guiding units 10a are disposed on the substrate 11 and connected with each other in a serial-and-parallel arrangement.

Figure 3B:
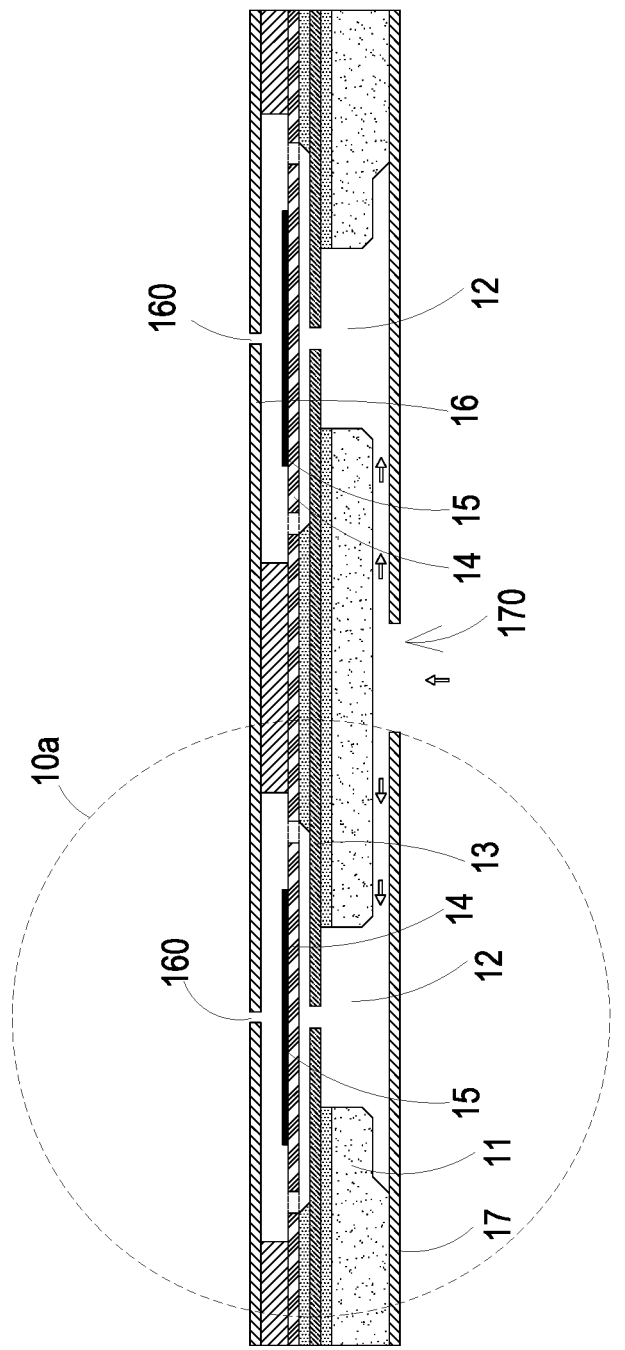
FIG. 3B schematically illustrates a portion of the fluid active region of the fluid system, in which the fluid-guiding units are connected with each other and disposed in a serial arrangement.
Figure 3C:
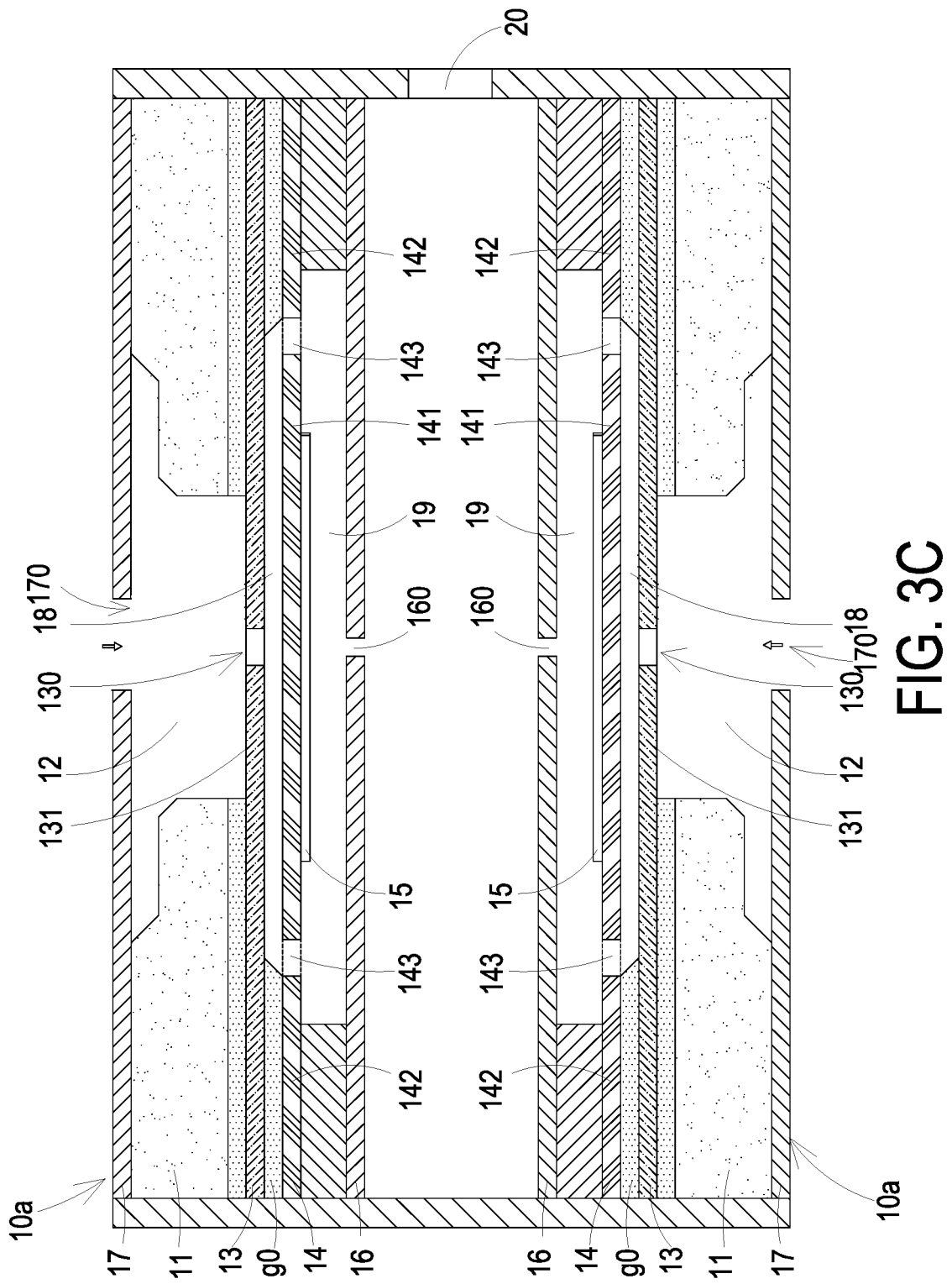
FIG. 3C schematically illustrates a portion of the fluid active region of the fluid system, in which the fluid-guiding units are connected with each other and disposed in a parallel arrangement.
Figure 3D:
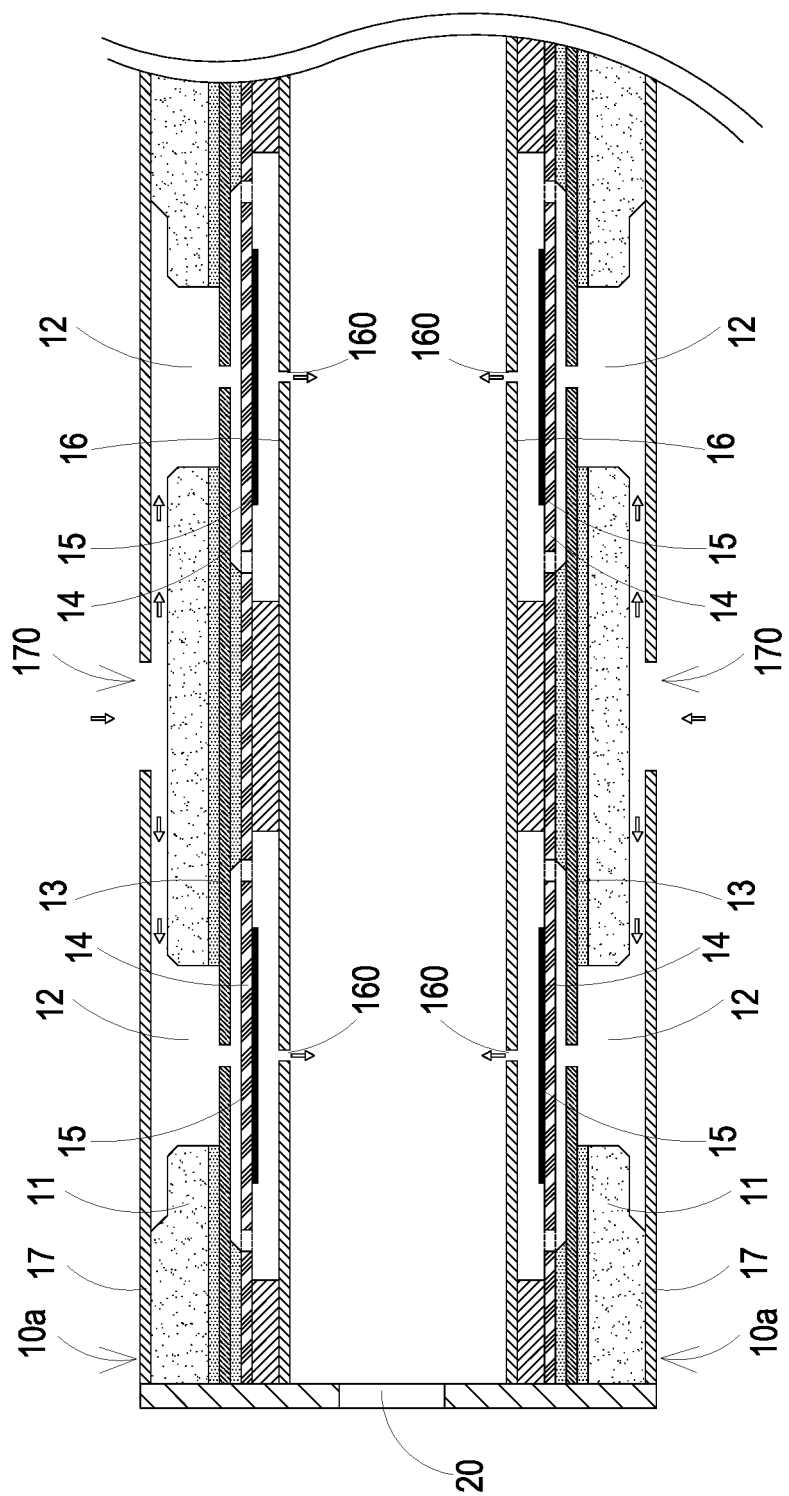
FIG. 3D schematically illustrates a portion of the fluid active region of the fluid system, in which the fluid-guiding units are connected with each other and disposed in a serial-and-parallel arrangement.

Please refer to FIGS. 3B, 3C and 3D. FIG. 3B schematically illustrates a portion of the fluid active region of the fluid system, in which the fluid-guiding units are connected with each other and disposed in a serial arrangement. FIG. 3C schematically illustrates a portion of the fluid active region of the fluid system, in which the fluid-guiding units are connected with each other and disposed in a parallel arrangement. FIG. 3D schematically illustrates a portion of the fluid active region of the fluid system, in which the fluid-guiding units are connected with each other and disposed in a serial-and-parallel arrangement. As shown in FIG. 3B, the fluid-guiding units 10a of the fluid active region 10 are connected with each other and disposed in a serial arrangement. Since the fluid-guiding units 10a are connected with each other in series, the pressure of the fluid at the outlet apertures 160 of the fluid active region 10 is increased. As shown in FIG. 3C, the fluid-guiding units 10a of the fluid active region 10 are connected with each other and disposed in a parallel arrangement. Since the fluid-guiding units 10a are connected with each other in parallel, the amount of the fluid to be discharged out from the outlet apertures 160 of the fluid active region 10 is increased. As shown in FIG. 3D, the fluid-guiding units 10a of the fluid active region 10 are connected with each other and disposed in a serial-and-parallel arrangement. Consequently, the pressure of the fluid and the amount of the fluid to be discharged out from the fluid active region 10 are increased synchronously.

Figure 4:
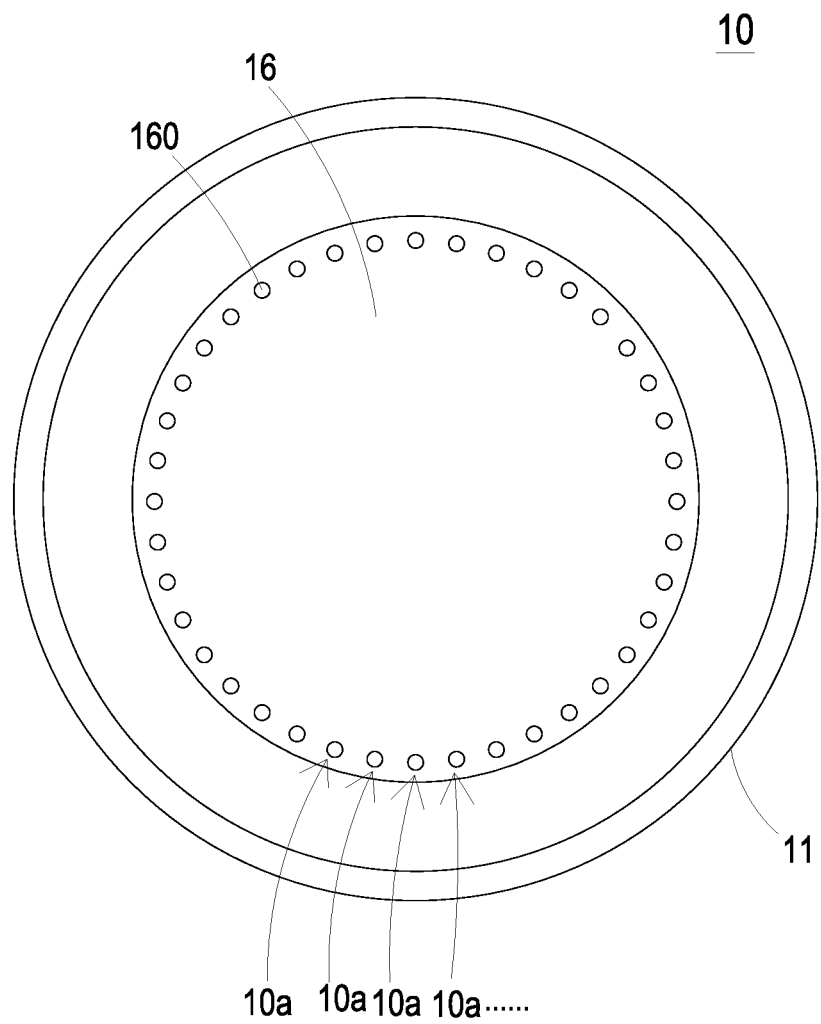
FIG. 4 schematically illustrates a variant example of the fluid active region of the fluid system.
Figure 5:
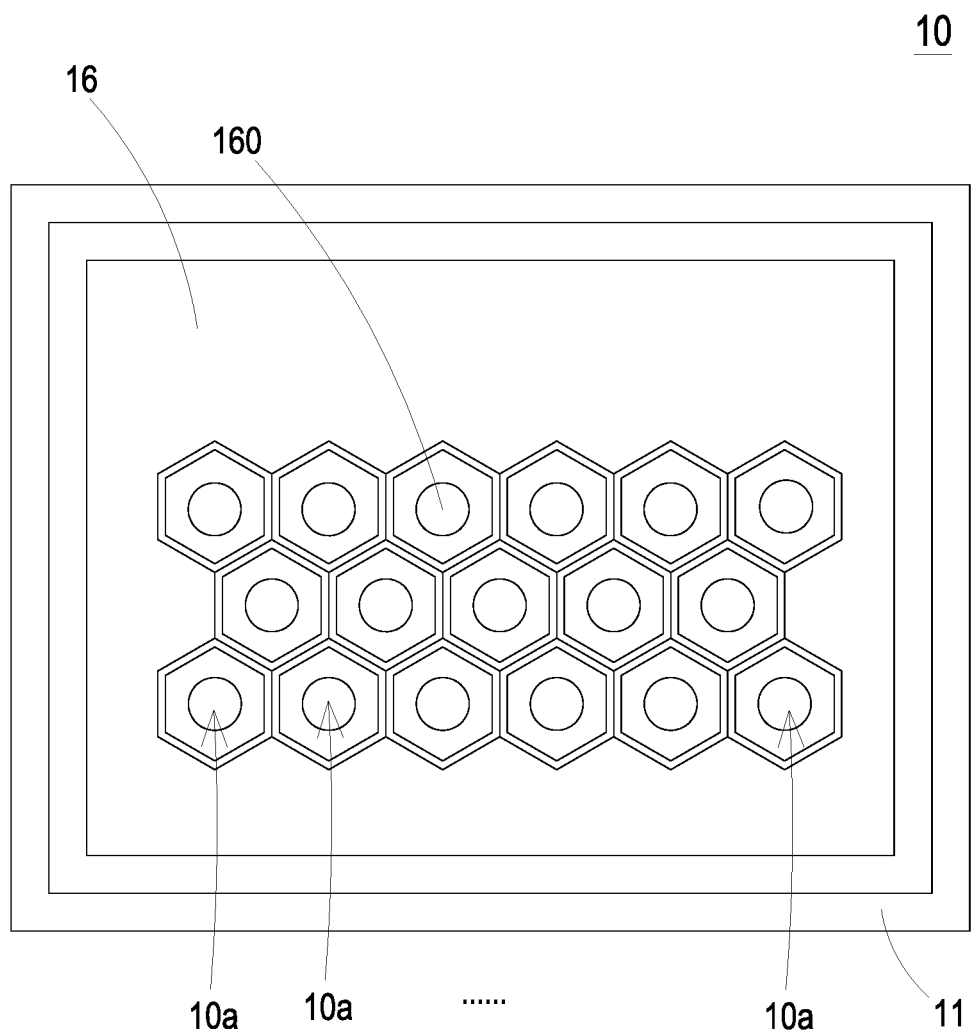
FIG. 5 schematically illustrates another variant example of the fluid active region of the fluid system.

FIG. 4 schematically illustrates a variant example of the fluid active region of the fluid system. FIG. 5 schematically illustrates another variant example of the fluid active region of the fluid system. As shown in FIG. 4, in this embodiment, the fluid-guiding units 10*a* of the fluid active region 10 are connected with each other and disposed in a ring-shaped arrangement so as to transport the fluid. As shown in FIG. 5, in this embodiment, the fluid-guiding units 10*a* of the fluid active region 10 are connected with each other and disposed in a honeycomb arrangement.

In this embodiment, the connections between the fluid-guiding units 10*a* of the fluid system 100 and the driving circuit may be varied, so that the utilization flexibility is enhanced. Moreover, the fluid system 100 can be applied to various electronic components, and the fluid-guiding units 10*a* of fluid system 100 may be enabled to transport fluid simultaneously so as to transport a great amount of fluid according to the practical requirements. Moreover, two fluid-guiding units 10*a* may be individually controlled to be enabled or disabled. For example, one fluid-guiding unit 10*a* is enabled, and the other fluid-guiding unit 10*a* is disabled. In another embodiment, the two fluid-guiding units 10*a* are alternately enabled, but not limited thereto. Consequently, the purpose of transporting various amount of the fluid and the purpose of reducing the power consumption can be achieved.

FIGS. 6A and 6B are schematic cross-sectional views illustrating the actions of an exemplary valve used in the fluid system of the present disclosure. The valve 50 includes a base 51, a piezoelectric actuator 52 and a linking bar 53. For example, the valve 50 is disposed in the sub-branch channel 21*a*. The structures and actions of the valves 50 disposed in the sub-branch channels 22*a*, 21*b* and 22*b* are similar to the structure and the actions of the valve 50 disposed in the sub-branch channel 21*a*, and are not redundantly described herein. The base 51 includes a first passage 511 and a second passage 512, which are in communication with the sub-branch channel 21*a* and are separated from each other by a partial structure of the base 51. A cavity 513 is concavely formed in the top surface of the base 51. The cavity 513 has a first outlet 514 and a second outlet 515. The first outlet 514 is in communication with the first passage 511, and the second outlet 515 is in communication with the second passage 512. The piezoelectric actuator 52 includes a carrier plate 521 and a piezoelectric ceramic plate 522. The carrier plate 521 may be made of a flexible material. The piezoelectric ceramic plate 522 is attached on a first surface of the carrier plate 521 and electrically connected to the controller 60. The piezoelectric actuator 52 is located over the cavity 513 to cover the cavity 513. A first end of the linking bar 53 is connected with a second surface of the carrier plate 521, and the linking bar 53 is inserted into the second outlet 515 and is free to move within the second outlet 515 along a vertical direction. A second end of the linking bar 53 is formed as a stopping part 531 to be used to close the second outlet 515. Moreover, the stopping part 531 is used to restrict communication between the second outlet 515 and the second passage 512. The cross section area of the stopping part 531 is larger than the diameter of the second outlet 515. Preferably but not exclusively, the stopping part 531 may be a flat plate structure or a mushroom-shaped structure.

Please refer to FIG. 6A. When the piezoelectric actuator 52 of the valve 50 is not enabled, the linking bar 53 is in an initial position and in a normally open state. Meanwhile, a communication space is formed between the stopping part 531 and the second outlet 515 for allowing the second passage 512, the cavity 513 and the first passage 511 to be in fluid communication with each other and in fluid communication with the sub-branch channel 21*a* and allowing the fluid to flow therethrough. On the contrary, referring to FIG. 6B, when the piezoelectric actuator 52 is enabled, the carrier plate 521 is driven to undergo upward bending deformation by the piezoelectric ceramic plate 522, so that the linking bar 53 is driven to move upwardly by the carrier plate 521. Consequently, the second outlet 515 is covered and blocked by the stopping part 531. Since the second outlet 515 is closed by the stopping part 531, the fluid cannot be transported through the second outlet 515. As mentioned above, when the valve 50 is disabled, the sub-branch channel 21*a* is maintained in the open state. When the valve 50 is enabled, the sub-branch channel 21*a* is in the close state. In other words, by controlling an opened/closed state of the second passage 512 of valve 50, the fluid is selectively discharged out through the sub-branch channel 21*a*.

FIGS. 7A and 7B are schematic cross-sectional views illustrating the actions of another exemplary valve used in the fluid system of the present disclosure. The structure of the valve 50 is similar to that of FIGS. 6A and 6B and is not described herein. In contrast, the valve 50 is in a normally closed state when the valve 50 is not enabled. It will be described as follows.

Please refer to FIG. 7A. When the piezoelectric actuator 52 of the valve 50 is not enabled, the linking bar 53 is in an initial position and in a normally closed state. Meanwhile, the second outlet 515 is covered by the stopping part 531. Since the second outlet 515 is closed by the stopping part 531, the fluid cannot be transported through the second outlet 515. Please refer to FIG. 7B. When the piezoelectric actuator 52 is enabled, the carrier plate 521 is driven to undergo downward bending deformation by the piezoelectric ceramic plate 522, so that the linking bar 53 is driven to move downwardly by the carrier plate 521. Under this circumstance, a communication space is formed between the stopping part 531 and the second outlet 515 for allowing the second passage 512, the cavity 513 and the first passage 511 to be in fluid communication with each other and in fluid communication with the sub-branch channel 21*a* and allowing the fluid to flow therethrough. As mentioned above, when the valve 50 is disabled, the sub-branch channel 21*a* is maintained in the close state. When the valve 50 is enabled, the sub-branch channel 21*a* is in the open state. In other words, by controlling an opened/closed state of the second passage 512 of the valve 50, the fluid is selectively discharged out through the sub-branch channel 21*a*.

From the above descriptions, the present disclosure provides the fluid system. The at least one fluid-guiding unit is used for transporting the fluid to the convergence chamber. The valves disposed in the branch channels are used to control and adjust the amount, flow rate and pressure of the fluid to be discharged from the fluid system. The numbers, arrangements and driving methods of the at least one fluid-guiding unit and the branch channels may be flexibly varied according to the practical requirements. In other words, the fluid system of the present disclosure can provide the efficacy of transporting a great amount of fluid in a high performance and high flexible manner according to various applied devices and required amount of fluid to be transported.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fluid system, produced by an integrating method, the fluid system comprising:
   a fluid active region comprising at least one fluid-guiding unit, wherein the at least one fluid-guiding unit is enabled under control to transport fluid to be discharged out through at least one outlet aperture;
   a fluid channel in communication with the at least one outlet aperture of the fluid active region, and having plural branch channels to split the fluid discharged from the fluid active region, so that a specific required amount of the fluid to be transported is determined;
   a convergence chamber in communication with the fluid channel and disposed for allowing the fluid to be accumulated therein; and
   a plurality of valves each of which being in communication with and disposed in the corresponding branch channel, wherein each of the plurality of valves includes a base, a piezoelectric actuator and a linking bar, and the base includes a first passage and a second passage which are separated from each other by the base, wherein a cavity is concavely formed on a top surface of the base, the cavity includes a first outlet and a second outlet, and the first outlet is in communication with the first passage and the second outlet is in communication with the second passage, wherein the piezoelectric actuator covers the cavity and the linking bar is connected with the piezoelectric actuator, wherein the plurality of valves are downstream from the convergence chamber and the fluid is discharged out through the branch channels according to opened/closed states of the valves under control,
   wherein each of the at least one fluid-guiding unit is a piezoelectric pump including an inlet plate, a substrate, a resonance plate, an actuating plate, a piezoelectric element and an outlet plate, which are stacked on each other sequentially,
   wherein the inlet plate comprises at least one inlet aperture, the resonance plate comprises a central aperture and a movable part, and the movable part is a flexible structure of the resonance plate that is not fixed and disposed on the substrate,
   wherein a first chamber is formed in the substrate and formed between the resonance plate and the inlet plate, the actuating plate is a hollow and suspension structure, and the actuating plate comprises a suspension part, an outer frame part and plural vacant spaces,
   wherein a second chamber is formed between the actuating plate and the resonance plate, the outlet plate comprises an outlet aperture, and a third chamber is formed between the actuating plate and the outlet plate.

2. The fluid system according to claim 1, wherein the at least one fluid-guiding unit of the fluid active region comprises plural fluid-guiding units, and the plural fluid-guiding units are connected with each other and disposed in a serial arrangement to transport the fluid.

3. The fluid system according to claim 1, wherein the at least one fluid-guiding unit of the fluid active region comprises plural fluid-guiding units, and the plural fluid-guiding units are connected with each other and disposed in a parallel arrangement to transport the fluid.

4. The fluid system according to claim 1, wherein the at least one fluid-guiding unit of the fluid active region comprises plural fluid-guiding units, and the plural fluid-guiding units are connected with each other and disposed in a serial-and-parallel arrangement to transport the fluid.

5. The fluid system according to claim 1, wherein the at least one fluid-guiding unit of the fluid active region comprises plural fluid-guiding units, and the plural fluid-guiding units are connected with each other and disposed in a ring-shaped arrangement to transport the fluid.

6. The fluid system according to claim 1, wherein the at least one fluid-guiding unit of the fluid active region comprises plural fluid-guiding units, and the plural fluid-guiding units are connected with each other and disposed in a honeycomb arrangement to transport the fluid.

7. The fluid system according to claim 1, wherein the lengths of the plural branch channels are preset according to the specific required amount of the fluid to be transported.

8. The fluid system according to claim 1, wherein the widths of the plural branch channels are preset according to the specific required amount of the fluid to be transported.

9. The fluid system according to claim 1, wherein the plurality of valves are active valves.

10. The fluid system according to claim 9, wherein the opened/closed states of the plurality of valves are controlled by a controller.

11. The fluid system according to claim 10, wherein the controller and the at least one fluid-guiding unit are made by a system-in-package manner to form an integrated structure.

12. The fluid system according to claim 1, wherein the plural branch channels are connected with each other and disposed in a serial arrangement.

13. The fluid system according to claim 1, wherein the plural branch channels are connected with each other and disposed in a parallel arrangement.

14. The fluid system according to claim 1, wherein the plural branch channels are connected with each other and disposed in a serial-and-parallel arrangement.

15. A fluid system, produced by an integrating method, the fluid system comprising:
   at least one fluid active region comprising at least one fluid-guiding unit, wherein the at least one fluid-guiding unit is enabled under control to transport fluid to be discharged out through at least one outlet aperture;
   at least one fluid channel in communication with the at least one outlet aperture of the fluid active region, and having plural branch channels to split the fluid discharged from the fluid active region, so that a specific required amount of the fluid to be transported is determined;
   at least one convergence chamber in communication with the fluid channel and disposed for allowing the fluid to be accumulated therein; and
   a plurality of valves each of which being in communication with and disposed in the corresponding branch channel, wherein each of the plurality of valves includes a base, a piezoelectric actuator and a linking bar, and the base includes a first passage and a second passage which are separated from each other by the base, wherein a cavity is concavely formed on a top surface of the base, the cavity includes a first outlet and a second outlet, and the first outlet is in communication with the first passage and the second outlet is in communication with the second passage, wherein the piezoelectric actuator covers the cavity and the linking bar is connected with the piezoelectric actuator, wherein the plurality of valves are downstream from the convergence chamber and the fluid is discharged out through the branch channels according to opened/closed states of the valves under control, wherein each of the at least one fluid-guiding unit is a piezoelectric pump including an inlet plate, a substrate, a resonance plate, an actuating plate, a piezoelectric element and an outlet plate, which are stacked on each other sequentially, wherein the inlet plate comprises at least one inlet aperture, the resonance plate comprises a central aperture and a movable part, and the movable part is a flexible structure of the resonance plate that is not fixed and disposed on the substrate, wherein a first chamber is formed in the substrate and formed between the resonance plate and the inlet plate, the actuating plate is a hollow and suspension structure, and the actuating plate comprises a suspension part, an outer frame part and plural vacant spaces, wherein a second chamber is formed between the actuating plate and the resonance plate, the outlet plate comprises an outlet aperture, and a third chamber is formed between the actuating plate and the outlet plate.

* * * * *